US011307399B2

(12) United States Patent
Takahashi et al.

(10) Patent No.: US 11,307,399 B2
(45) Date of Patent: Apr. 19, 2022

(54) INFORMATION PROCESSING DEVICE, INFORMATION PROCESSING METHOD, PROGRAM, AND MICROSCOPE SYSTEM

(71) Applicant: Sony Corporation, Tokyo (JP)

(72) Inventors: Masahiro Takahashi, Kanagawa (JP); Shinji Watanabe, Tokyo (JP)

(73) Assignee: Sony Corporation, Tokyo (JP)

(*) Notice: Subject to any disclaimer, the term of this patent is extended or adjusted under 35 U.S.C. 154(b) by 328 days.

(21) Appl. No.: 14/400,445

(22) PCT Filed: Mar. 13, 2013

(86) PCT No.: PCT/JP2013/056951
§ 371 (c)(1),
(2) Date: Nov. 11, 2014

(87) PCT Pub. No.: WO2013/179723
PCT Pub. Date: Dec. 5, 2013

(65) Prior Publication Data
US 2015/0116479 A1 Apr. 30, 2015

(30) Foreign Application Priority Data
May 28, 2012 (JP) .............................. JP2012-120609

(51) Int. Cl.
G02B 21/36 (2006.01)
(52) U.S. Cl.
CPC .................................. G02B 21/367 (2013.01)
(58) Field of Classification Search
CPC .................................................... G02B 21/367
See application file for complete search history.

(56) References Cited

U.S. PATENT DOCUMENTS

| 6,091,842 A * | 7/2000 | Domanik ........... G01N 15/1468 250/201.3 |
| 2004/0047033 A1 | 3/2004 | Nakagawa |
| 2004/0202357 A1 * | 10/2004 | Perz ..................... G06K 9/0014 382/128 |
| 2007/0058054 A1 | 3/2007 | Kagayama et al. |
| 2010/0083410 A1 * | 4/2010 | Hattori ............... G02B 21/0032 850/1 |

(Continued)

FOREIGN PATENT DOCUMENTS

| JP | 09-138355 | 5/1997 |
| JP | 11-344676 | 12/1999 |

(Continued)

OTHER PUBLICATIONS

International Search Report issued in connection with International Patent Application Serial No. PCT/JP2013/056951, dated Jun. 4, 2013. (2 pages).

Primary Examiner — Hesham K Abouzahra
(74) Attorney, Agent, or Firm — K&L Gates LLP

(57) ABSTRACT

Provided is an information processing device including an image analysis unit which divides an entire image in which an entire observation target region is imaged into a plurality of regions, and then judges whether an observation target is present in each region, and an imaging control unit which controls imaging of partial images with a magnification higher than a magnification of the entire image corresponding to the regions based on judgment results of the image analysis unit.

18 Claims, 8 Drawing Sheets

(56) References Cited

U.S. PATENT DOCUMENTS

| | | | | |
|---|---|---|---|---|
| 2010/0177189 A1* | 7/2010 | Rughani | .............. | G02B 21/244 348/79 |
| 2011/0205353 A1* | 8/2011 | Fujisawa | .............. | G02B 21/008 348/80 |
| 2013/0077892 A1* | 3/2013 | Ikeno | .................. | G02B 21/367 382/286 |

FOREIGN PATENT DOCUMENTS

| | | |
|---|---|---|
| JP | 2004-101871 | 4/2004 |
| JP | 2006-284965 | 10/2006 |
| JP | 2008-052227 | 3/2008 |
| JP | 2011-118107 | 6/2011 |
| JP | 2012-003116 | 1/2012 |
| JP | 2012-010275 | 1/2012 |
| JP | 2013-068706 | 4/2013 |

\* cited by examiner

1: DIGITAL MICROSCOPE
2: INFORMATION PROCESSING DEVICE
3: SERVER
4: IMAGE DISPLAY DEVICE
5: NETWORK

FIG. 7

6: OBSERVATION TARGET

A

| 0 | 0 | 0 | 0 | 2 | 2 | 0 | 0 |
|---|---|---|---|---|---|---|---|
| 0 | 0 | 0 | 2 | 2 | 2 | 2 | 0 |
| 0 | 0 | 1 | 2 | 2 | 2 | 2 | 1 |
| 0 | 1 | 2 | 2 | 2 | 2 | 2 | 1 |
| 0 | 0 | 2 | 2 | 2 | 2 | 2 | 0 |
| 1 | 2 | 2 | 2 | 2 | 2 | 2 | 0 |
| 1 | 2 | 2 | 2 | 2 | 2 | 2 | 2 |
| 1 | 2 | 2 | 2 | 2 | 2 | 2 | 2 |
| 0 | 0 | 0 | 0 | 2 | 2 | 2 | 0 |

B

| 0 | 0 | 0 | 0 | 1 | 1 | 0 | 0 |
|---|---|---|---|---|---|---|---|
| 0 | 0 | 0 | 1 | 2 | 2 | 1 | 0 |
| 0 | 0 | 1 | 2 | 2 | 2 | 2 | 1 |
| 0 | 1 | 2 | 2 | 2 | 2 | 2 | 1 |
| 0 | 0 | 1 | 2 | 2 | 2 | 1 | 0 |
| 1 | 1 | 2 | 2 | 2 | 2 | 1 | 0 |
| 1 | 2 | 2 | 2 | 2 | 2 | 2 | 1 |
| 1 | 1 | 1 | 1 | 2 | 2 | 2 | 1 |
| 0 | 0 | 0 | 0 | 1 | 1 | 1 | 0 |

6: OBSERVATION TARGET

INFORMATION PROCESSING DEVICE, INFORMATION PROCESSING METHOD, PROGRAM, AND MICROSCOPE SYSTEM

CROSS REFERENCES TO RELATED APPLICATIONS

The present application is a national stage of International Application No. PCT/JP2013/056951 filed on Mar. 13, 2013 and claims priority to Japanese Patent Application No. 2012-120609 filed on May 28, 2012, the disclosure of which is incorporated herein by reference.

BACKGROUND

The present technique relates to an information processing device, an information processing method, a program thereof, and a microscope system having an information processing device of processing image information imaged by a microscope. More specifically, the present technique relates to a technique of dividing and imaging an observation target region, and then combining two or more of the obtained partial images to composite a wide-visual-field microscope image.

In the fields, such as medical treatment, pathology, biology, and materials, a technique of dividing and imaging an observation target region by a digital microscope, and then combining two or more of the obtained partial images is employed in order to obtain a microscope observation image with a wide visual field and with a high magnification. A virtual microscope system employing this technique allows a user to display an arbitrary position of the obtained microscope observation image with an arbitrary magnification and also to display the image at a distant place through a network, and therefore has drawn attention particularly in the use thereof for biopsy and cytoscopy in pathology diagnosis.

On the other hand, in order to obtain a high-resolution microscope observation image by the virtual microscope system, an observation target region may be divided into smaller divisions, and then imaged but, as the number of partial images increases, it is necessary to perform imaging and combining processing (stitching) with higher accuracy. Then, in order to obtain a high quality microscope observation image in a short time, various examinations have been made in the virtual microscope system heretofore (for example, Patent Literatures 1 to 3).

For example, Patent Literature 1 has proposed a microscope system in which a processing device which generates partial images and a processing device which performs combining processing are separately provided for the purpose of shortening the processing time. Patent Literature 2 has proposed a microscope device which detects a position shift when imaging partial images, and then corrects combining positions of the respective partial images based on the detection results in order to prevent an error caused by an imaging position shift in scanning. Patent Literature 3 has proposed a technique of providing overlapping regions in the respective partial images to be combined, performing matching processing for the regions, and then performing combining processing based on the matching processing results and position information to thereby composite a microscope observation image without distortion.

CITATION LIST

Patent Literature

| | |
|---|---|
| Patent Literature 1: | JP 2011-118107A |
| Patent Literature 2: | JP 2006-284965A |
| Patent Literature 3 | JP 2012-10275A |

SUMMARY

Technical Problem

However, the above-described former techniques have problems that the combining accuracy of the partial images is insufficient. Specifically, when the combining processing is performed only based on the imaging position information as in Patent Literature 2, there is a high possibility that an error arises in the combined portions, and, as the number of the partial images increases, the combining error becomes larger.

The combining error can be reduced by performing the matching processing as in the technique described in Patent Literature 3. However, also according to the method, matching cannot be achieved unless a sample is present in the overlapping region (matching portion), and thus the partial images are combined based on position information. Therefore, in the virtual microscope system, a development of a technique capable of combining a large number of partial images with high accuracy has been demanded.

Then, it is a main object of the present disclosure to provide an information processing device, an information processing method, a program, and a microscope system capable of combining a plurality of digital images with high accuracy to composite a microscope observation image with a wide visual field and with a high resolution.

Solution to Problem

An information processing device according to the present disclosure includes an image analysis unit which divides an entire image in which an entire observation target region is imaged into a plurality of regions, and then judges whether an observation target is present in each region, and an imaging control unit which controls imaging of partial images with a magnification higher than a magnification of the entire image corresponding to the regions based on judgment results of the image analysis unit. The imaging control unit controls the imaging in a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

According to the information processing device of the present disclosure, the second partial image corresponding to the region adjacent to the region where the observation target is not present among the regions where the observation target may be present is imaged later, and therefore the combining processing of the partial images in which the observation target is not present decreases. Thus, an error is hard to generate in the combining processing, so that the combining accuracy improves.

The image analysis unit may calculate a likelihood showing a possibility that the observation target is present in each region.

In that case, the imaging control unit can control the imaging of the partial images in a manner that imaging is performed from a region with a higher likelihood in decreasing order.

Further, the information processing device may include a presence level processing unit which lowers a likelihood of a region adjacent to a region where the observation target is not present among regions where the observation target may be present.

The presence level processing unit may replace the likelihood of the region adjacent to the region where the observation target is not present among the regions where the observation target may be present by a minimum likelihood in a range where it is judged that the observation target is present, for example.

Further, the presence level processing unit may classify each region of the entire image into a first region where the observation target is present with a first likelihood, a second region where the observation target is present with a second likelihood lower than the first likelihood, and a third region where the observation target is not present and may also classify the region adjacent to the region where the observation target is not present among the regions where the observation target may be present into the second region.

In addition, the presence level processing unit can replace a likelihood of the region adjacent to the region where the observation target may be present among the regions where the observation target is not present by a minimum likelihood in a range where it is judged that the observation target is present.

Still further, the presence level processing unit may classify each region of the entire image into a first region where the observation target is present with a first likelihood, a second region where the observation target is present with a second likelihood lower than the first likelihood, and a third region where the observation target is not present and may also change the classification of the region adjacent to the region where the observation target may be present among the regions where the observation target is not present to the second region from the third region.

On the other hand, the information processing device according to the present disclosure may also include a presence map generation unit which creates a presence map showing presence information of the observation target based on the judgment results of the image analysis unit.

Further, the information processing device may include an imaging order generation unit which creates imaging order of the partial images based on the judgment results of the image analysis unit, and the imaging control unit may control drive of the microscope based on the imaging order created by the imaging order generation unit.

In that case, the imaging order generation unit may create the imaging order in a manner that movement length becomes smaller.

The information processing device may further include an entire image storage unit in which the entire image is stored.

The information processing device may further include an image compositing unit which combines the partial images to composite a microscope observation image with a magnification higher than a magnification of the entire image.

The information processing device may further include a communication unit capable of communicating with a server on a network, and the image analysis unit can transmit information on the judgment results of the regions obtained by the image analysis unit to the server through the communication unit.

An information processing method according to the present disclosure includes an image analysis step of dividing an entire image in which an entire observation target region is imaged into a plurality of regions, and then judging whether an observation target is present in each region by an image analysis unit, and an imaging control step of controlling imaging of partial images corresponding to the regions and having a magnification higher than a magnification of the entire image based on judgment results in the image analysis step by an imaging control unit. The imaging control step controls the imaging in a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

A program according to the present disclosure causes a computer to execute an image analysis function of dividing an entire image in which an entire observation target region is imaged into a plurality of regions, and then judging whether an observation target is present in each region, and an imaging control function of, in imaging of partial images with a magnification higher than a magnification of the entire image corresponding to the regions based on judgment results obtained by the image analysis function, controlling the imaging in a manner that a first partial image corresponding to a region in which the observation target may be present and which is adjacent to a region where the observation target may be present is imaged, and then a second partial image corresponding to a region in which the observation target may be present and is adjacent to a region where the observation target is not present which is imaged.

A microscope system according to the present disclosure includes at least includes a microscope device at least having an entire image imaging unit which images an entire observation target region and a partial image imaging unit which images a part of the observation target region with a magnification higher than a magnification of the entire image, and an information processing device which controls the microscope device and processes each image imaged by the microscope device. The information processing device includes an image analysis unit which divides an entire image in which an entire observation target region is imaged into a plurality of regions, and then judges whether an observation target is present in each region, and an imaging control unit which controls imaging of partial images with a magnification higher than a magnification of the entire image corresponding to the regions based on judgment results of the image analysis unit. The imaging control unit controls the imaging in a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

Advantageous Effects of Invention

According to the present disclosure, the combining accuracy improves, and therefore a large number of partial images can be combined with high accuracy to composite a microscope observation image with a wide visual field and with a high resolution.

Additional features and advantages are described herein, and will be apparent from the following Detailed Description and the figures.

BRIEF DESCRIPTION OF THE FIGURES

FIG. 7 includes FIGS. 7A and 7B illustrating the outline of level change processing in a presence level processing unit 233, in which FIG. 7A is a view illustrating the level before the processing and FIG. 7B is a view illustrating the level after the processing.

DETAILED DESCRIPTION

Hereinafter, preferred embodiments of the present invention will be described in detail with reference to the appended drawings. The present disclosure is not limited to each embodiment described below. The description is given in the following order.
1. First Embodiment
   (Example of microscope system imaging outer side later)
2. Second Embodiment
   (Example of microscope system widely creating presence map)

1. First Embodiment

Configuration of Microscope System

Figure 1:
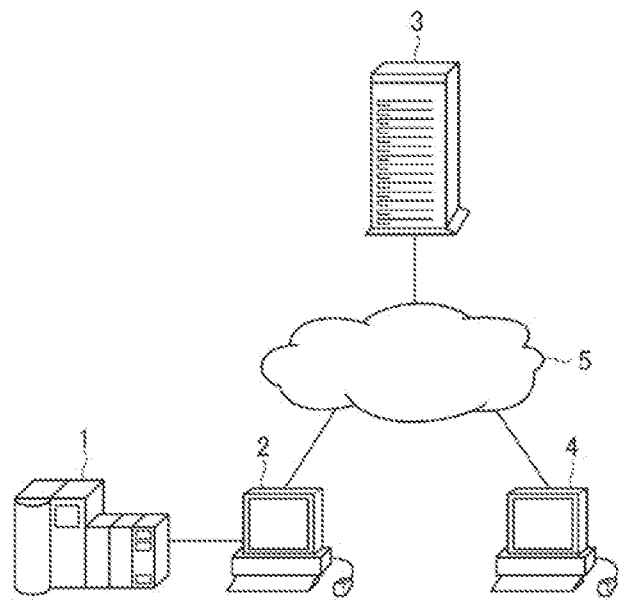
FIG. 1 is a view illustrating the outline of a microscope system of a first embodiment of the present disclosure.

First, a virtual microscope system according to a first embodiment of the present disclosure is described. FIG. 1 is a view illustrating the outline of the microscope system of this embodiment. The microscope system of this embodiment images and observes various prepared specimens with a high magnification and at least has a digital microscope 1 and an information processing device 2 as illustrated in FIG. 1.

The microscope system of this embodiment may be further provided with a server 3 and/or an image display unit 4. In this case, the information processing device 2, the server 3, and the image display unit 4 can be directly connected to each other but may be connected in such a manner as to be able to communicate with each other through a network 5.

[Digital Microscope 1]

Figure 2:
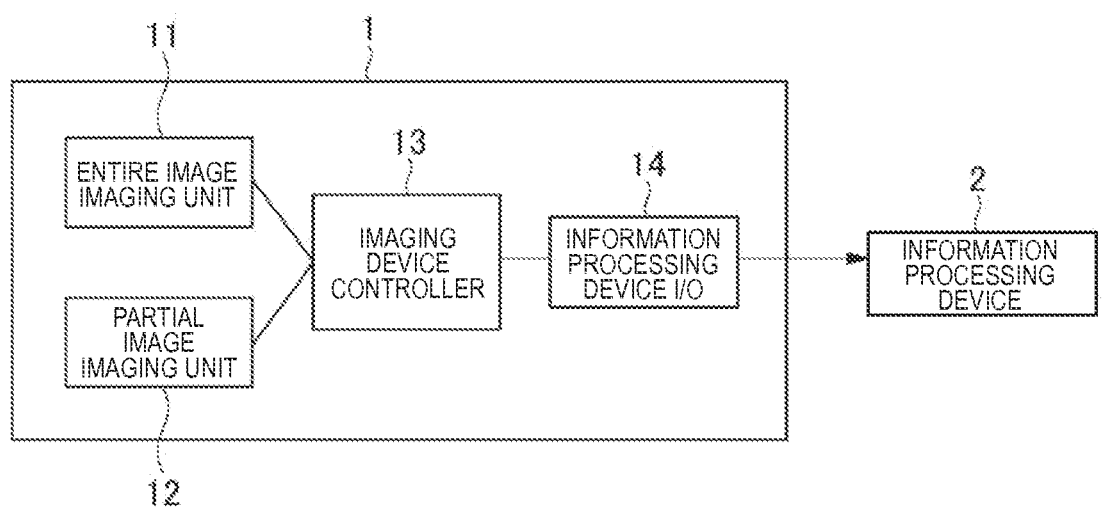
FIG. 2 is a block diagram illustrating a configuration example of a digital microscope 1 illustrated in FIG. 1.

The digital microscope 1 has a light source, an objective lens, an imaging device, a stage, and the like, and irradiates a prepared specimen placed on the stage with preset illumination light, and then images light penetrating the observation target, light emitted from the observation target, and the like. FIG. 2 is a block diagram illustrating a configuration example of the digital microscope 1. As illustrated in FIG. 2, the digital microscope 1 provided in the microscope system of this embodiment has an entire image imaging unit 11 and a partial image imaging unit 12.

The entire image imaging unit 11 is constituted by a light source, a low-magnification objective lens, a low-resolution imaging device, and the like, and images the entire observation target region of a prepared specimen placed on the stage with a low magnification and with a low resolution. On the other hand, the partial image imaging unit 12 is constituted by a light source, a high-magnification objective lens, a high-resolution imaging device, and the like, and images a part of the observation target region of a prepared specimen placed on the stage with a high magnification and with a high resolution. More specifically, the digital microscope 1 images a low resolution entire image (thumbnail image) and partial images (slide images) whose resolutions are higher than that of the entire image.

The digital microscope 1 may be provided with an imaging device controller 13 which controls the imaging processing by the entire image imaging unit 11 and the partial image imaging unit 12, an Input/Output interface unit 14 for connection with the information processing device 2, and the like. By providing the Input/Output interface unit 14, the input of control commands from the information processing device 2 and the output of each image data imaged by the entire image imaging unit 11 and the partial image imaging unit 12 to the information processing device 2 can be achieved.

[Information Processing Device 2]

Figure 3:
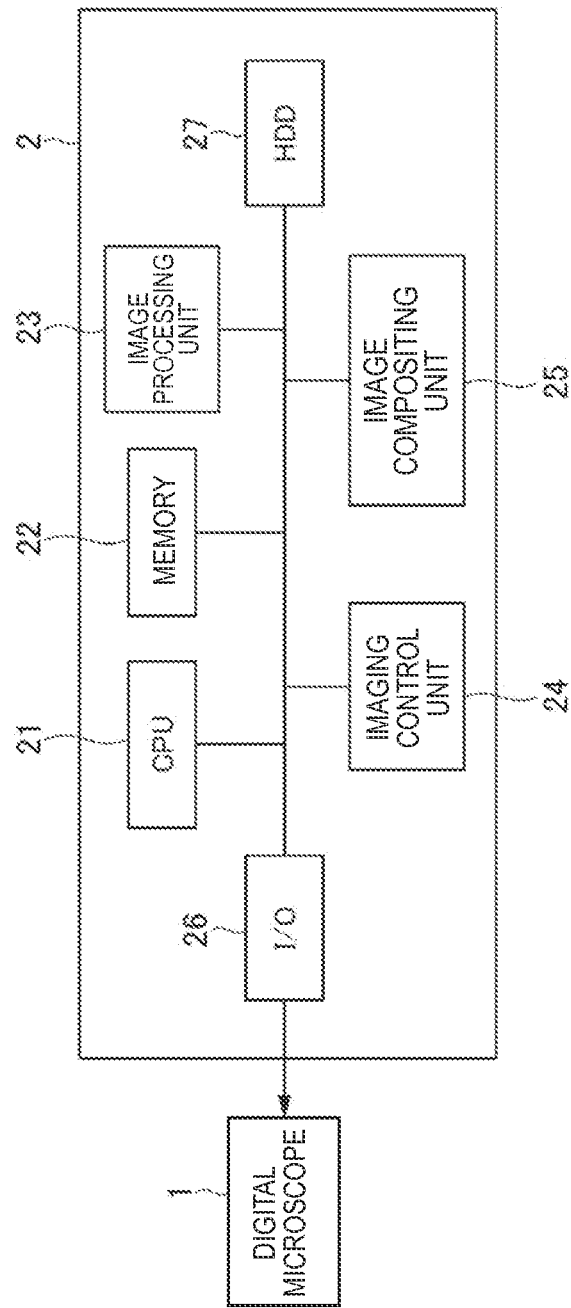
FIG. 3 is a block diagram illustrating a configuration example of an information processing device 2 illustrated in FIG. 1.

FIG. 3 is a block diagram illustrating a configuration example of the information processing device 2. The information processing device 2 has an imaging control unit 24 which controls the drive of the digital microscope 1 and an image processing unit 23 which processes each image imaged by the digital microscope 1. The information processing device 2 may be further provided with a CPU (Central Processing Unit) 21, a memory 22, an image compositing unit 25, an Input/Output interface unit 26, a hard disk 27, and the like.

(Image Processing Unit 23)

Figure 4:
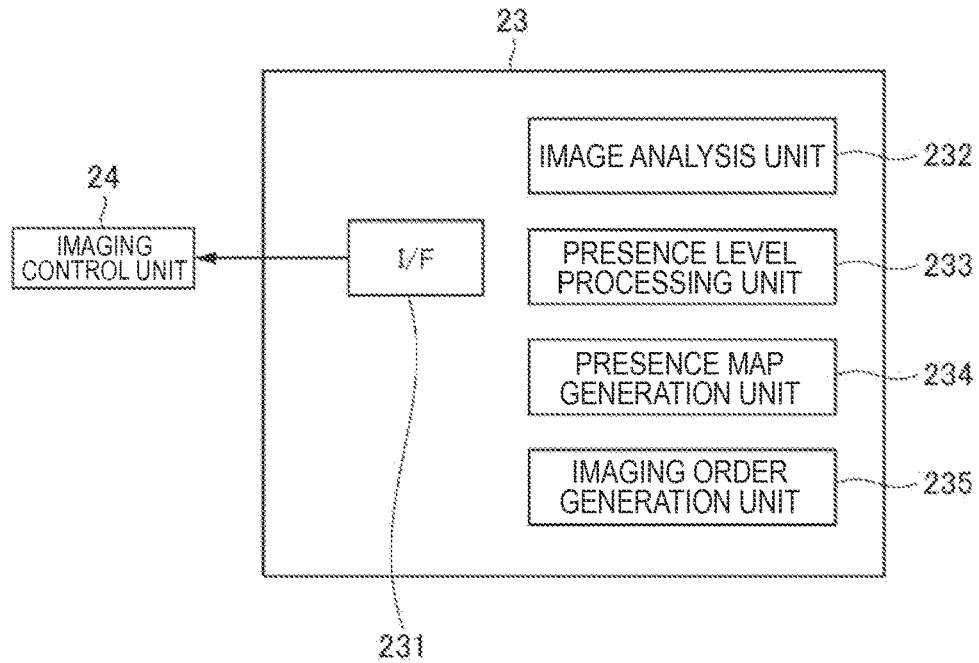
FIG. 4 is a block diagram illustrating a configuration example of an image processing unit 23 illustrated in FIG. 3.

FIG. 4 is a block diagram illustrating a configuration example of the image processing unit 23. As illustrated in FIG. 4, the image processing unit 23 is provided with an image analysis unit 232 which analyzes the entire image (thumbnail image) in which the entire observation target region is imaged. The image analysis unit 232 divides the entire image in which the entire observation target region is imaged into a plurality of regions, and then judges whether or not the observation target is present in each region.

A method for judging whether or not the observation target is present in the image analysis unit 232 is not particularly limited. For example, a method for calculating the likelihood which shows a possibility that the observation target is present in each region can be adopted, for example. The "likelihood" as used herein includes not only the presence probability of the observation target but the concept of the presence or absence of the presence thereof.

The image processing unit 23 may be provided with a presence level processing unit 233 which determines the presence level of each region based on the judgment results of the image analysis unit 232. In the presence level processing unit 233, the likelihood of a region adjacent to a region where the observation target is not present among regions where the observation target may be present, for example, is lowered rather than the judgment results of the image analysis unit 232. More specifically, even among the regions where the observation target may be present, in the region adjacent to the region where the observation target is not present, the possibility that the observation target is present is reduced.

Specifically, the likelihood of the region adjacent to the region where the observation target is not present among the regions where the observation target may be present is replaced by the lowest likelihood in the range where it is judged that the observation target is present, for example. For example, when each region of the entire image is classified into three stages: a first region where the observation target is present with a first likelihood, a second region where the observation target is present with a second likelihood lower than the first likelihood, and a third region where the observation target is not present, all regions adjacent to the third region are classified into the second region.

The image processing unit 23 may be further provided with a presence map generation unit 234. The presence map generation unit 234 creates a presence map which shows presence information of the observation target in each region based on the judgment results of the image analysis unit 232. When the presence level processing unit 233 is provided in the image processing unit 23, the presence map generation unit 234 creates a presence map based on the presence level determined in the presence level processing unit 233. When the likelihood is calculated by the image analysis unit 232, the presence map generation unit 234 can create the presence map based on the likelihood of each region.

The image processing unit 23 may be further provided with an imaging order generation unit 235 which creates order of imaging partial images by the digital microscope 1. In the imaging order generation unit 235, imaging order (imaging sequence) is created based on the judgment results of the image analysis unit 232. In the process, the imaging order generation unit 235 creates the imaging order in such a manner that a region in which the observation target may be present and which is adjacent to a region where the observation target may be present is imaged, and then a region in which the observation target may be present and is adjacent to a region where the observation target is not present is imaged.

It is preferable that the imaging order is created in such a manner that imaging is performed from regions in which a possibility that the observation target is present is higher in decreasing order and the movement length for the imaging becomes smaller. Furthermore, the imaging order generation unit 235 may create the imaging order based on the likelihood calculated by the image analysis unit 232, the presence level determined by the presence level processing unit 233, or the presence map created by the presence map generation unit 234. The created imaging order is output to the imaging control unit 24 through the interface 231.

(Imaging Control Unit 24)

The imaging control unit 24 controls the drive when imaging partial images by the digital microscope 1 based on the judgment results of the image analysis unit 232 and the like. Specifically, the imaging control unit 24 controls the drive of the digital microscope 1 in such a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

When the likelihood of each region is calculated by the image analysis unit 232, it is preferable for the imaging control unit 24 to control the drive of the digital microscope 1 in such a manner that imaging is performed from regions with a higher likelihood in decreasing order. When the imaging order generation unit 235 is provided in the image processing unit 23, the drive of the digital microscope 1 can also be controlled according to the imaging order (imaging sequence) created by the imaging order generation unit 235.

(CPU21)

The CPU21 comprehensively controls each unit provided in the information processing device 2, and executes a program which comprehensively controls the image processing unit 23, the imaging control unit 24, and the like described above. The CPU21 can also perform operation processing performed in each unit of the information processing device 2, encoding of an image, pattern matching processing of the partial images performed by the image compositing unit 25 described later, and the like.

(Memory 22)

The memory 22 is used as a working space of the CPU21 and temporarily stores partial images (slide images), an entire image (thumbnail image), and the like which are imaged by the digital microscope 1 and input from the Input/Output interface unit 26.

(Image Compositing Unit 25)

The image compositing unit 25 combines a plurality of partial images (slide images) imaged by the digital microscope 1 to composite a wide-visual-field microscope observation image with a high magnification and with a high resolution. The partial images (slide images) are successively input into the image compositing unit 25 through the Input/Output interface unit 26. Then, the partial images (slide images) are subjected to matching processing in the imaging order, and then combined (stitching) based on the matching results.

Herein, the microscope system of this embodiment images the partial images in such order that the region in which the observation target may be present and which is adjacent to the region where the observation target is not present is imaged after imaging the region in which the observation target may be present and which is adjacent to the region where the observation target may be present. Thus, the combining processing of the partial images in which the observation target is not present decreases, sot that an error is difficult to occur in the combining processing, and the combining accuracy improves.

(Hard Disk 27)

The hard disk 27 stores, for example, the processing results (the likelihood, the presence level, the presence map, and the imaging order of each region and the like) in the image processing unit 23, a wide-visual-field microscope observation image composited by the image compositing unit 25, and the like.

The data can be entirely or partially stored in the server 3 on the network 5. In this case, an interface (not illustrated) for connection with the server 3 may be provided in the information processing device 2 to achieve mutual communication through the network 5.

A computer program for realizing each function of the information processing device 2 described above can be created, and then mounted in a personal computer and the like. Such a computer program may be stored in recording media, such as a magnetic disk, an optical disk, a magneto-optical disk, and a flash memory, and can also be distributed through a network, for example.

[Server 3]

The server 3 manages various data uploaded from the information processing device 2, and outputs the data to the image display unit 4 or the information processing device 2 upon request. Moreover, the server 3 generates a GUI (Graphical User Interface) for a user of the image display unit 4 for images which can be browsed by the image display unit 4.

[Image Display Unit 4]

The image display unit 4 displays partial images (slide images) or a wide-visual-field microscope observation image obtained by compositing a plurality of partial images (slide images) output from the server 3 or the information processing device 2. For example, when a prepared specimen is a pathology specimen, a user (a person who browses an image) of the image display unit 4 is a doctor and the like, and performs pathology diagnosis based on the displayed image.

[Network 5]

The network 5 is a communication network which connects the information processing device 2, the server 3, and the image display unit 4 in such a manner as to be able to bi-directionally communicate with each other. The network 5 is constituted by, for example, public networks, such as Internet, a telephone network, a satellite communication network, and a broadcasting communication channel, and leased line networks, such as WAN (Wide Area Network), LAN (Local Area Network), IP-VPN (Internet Protocol-Virtual Private Network), Ethernet (Registered Trademark), and wireless LAN, and the like, and may be wired or wireless. The network 5 may be a communication network provided for exclusive use in the microscope system of this embodiment.

[Operation]

Figure 5:
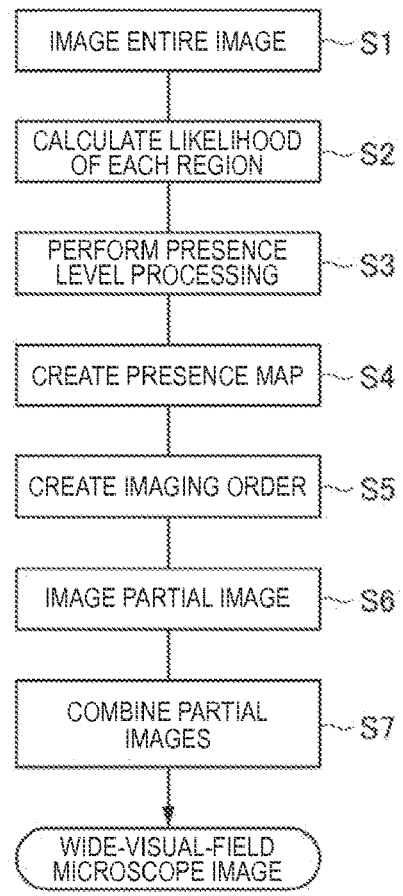
FIG. 5 is a flow chart diagram illustrating the outline of the entire operation of the microscope system of the first embodiment of the present disclosure.
Figure 6:
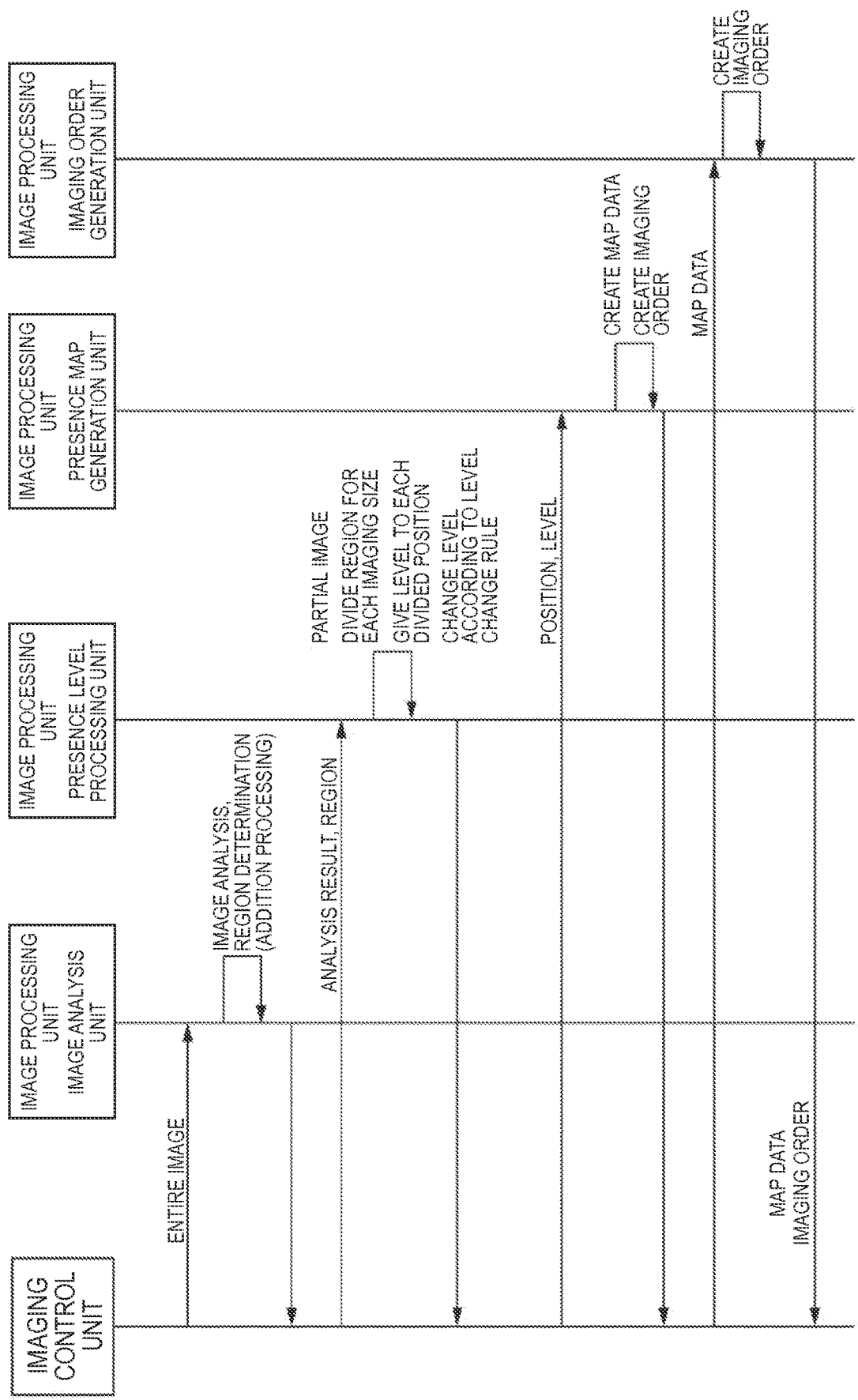
FIG. 6 is a sequence diagram illustrating processing and data flow in the information processing unit 2.

Next, one example of an operation of the microscope system of this embodiment is described. FIG. 5 is a flow chart diagram illustrating the outline of the entire operation of the microscope system of this embodiment. FIG. 6 is a sequence diagram illustrating processing and data flow in the information processing device 2 thereof.

As illustrated in FIG. 5, when a target is observed under a microscope by the microscope system of this embodiment, the entire image imaging unit 11 of the digital microscope 1 first images the entire observation target region of a prepared specimen placed on a stage with a low magnification and with a low resolution (Step S1). The entire image (thumbnail image) imaged in Step S1 is output from an interface 14 of the digital microscope 1, and then input into the image processing unit 23 through an interface 26 of the information processing device 2.

Then, the image analysis unit 232 of the image processing unit 23 divides the input entire image (thumbnail image) into a plurality of regions, and then judges by, for example, a method for calculating the likelihood or the like whether or not the observation target is present in each region (Step S2). For example, the likelihood of each region can be calculated by image recognition processing and the like.

Figure 8:
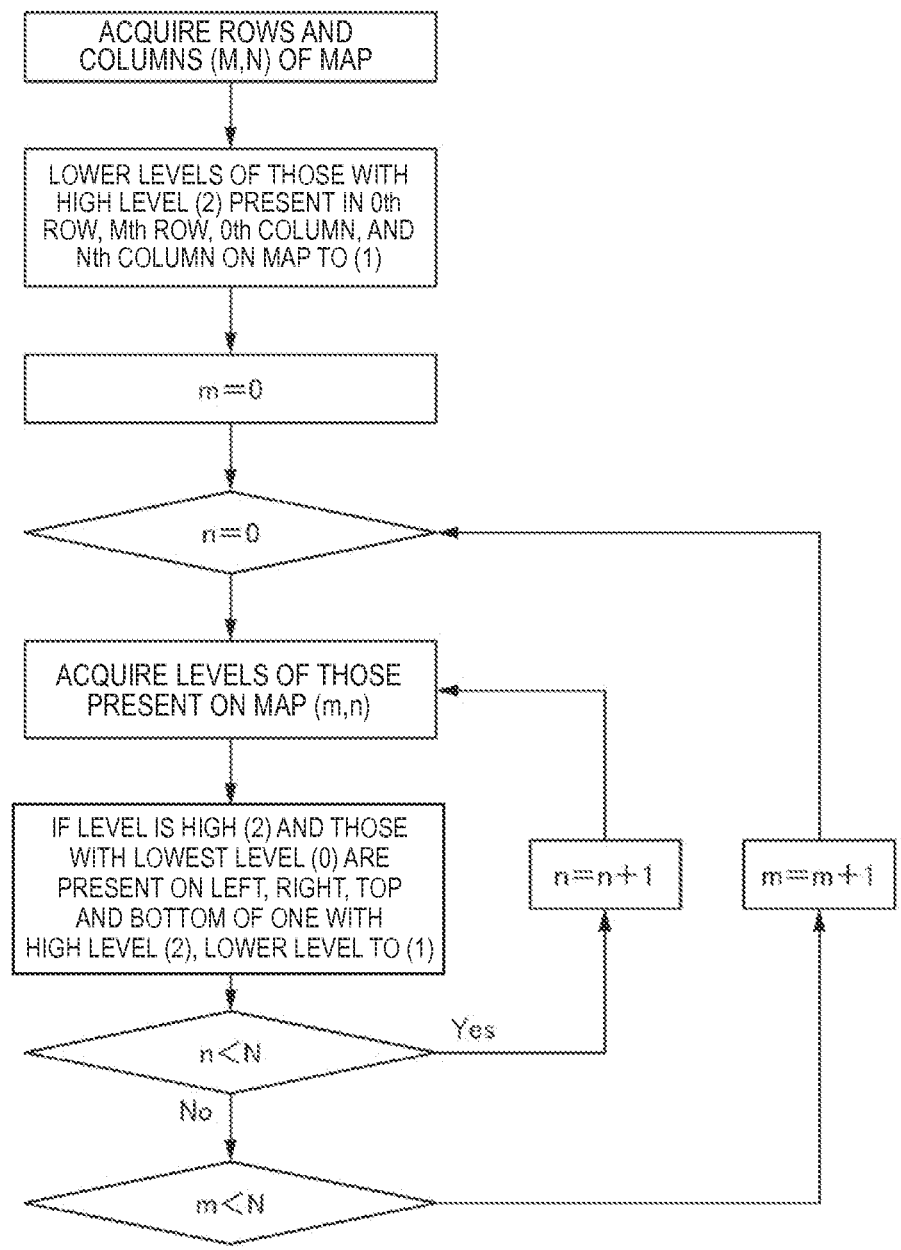
FIG. 8 is a flow chart diagram illustrating the flow of the level change processing in the presence level processing unit 233.

Subsequently, the presence level processing unit 233 performs processing of, for example, lowering the likelihood of a region adjacent to a region where the observation target is not present among regions where the observation target may be present than the judgment results of the image analysis unit 232, and then determines the presence level of each region (Step S3). FIG. 7 includes FIGS. 7A and 7B illustrating the outline of the level change processing in the presence level processing unit 233, in which FIG. 7A is a view illustrating the presence level before the processing and FIG. 7B is a view illustrating the presence level after the processing. FIG. 8 is a flow chart diagram illustrating the flow of the level change processing in the presence level processing unit 233.

For example, as illustrated in FIG. 7A, the presence level processing unit 233 classifies each region of the entire image into three stages: a region where an observation target 6 is present (Level 2), a region where the observation target 6 may be present (Level 1), and a region where the observation target 6 is not present (Level 0) according to the likelihood. In this stage, the presence level is "2" and the observation target 6 is present in the regions but the observation target 6 is not present in portions to be combined, and therefore regions where the combining processing is difficult to perform are present (portion circled with 0 of FIG. 7A).

Then, in the microscope system of this embodiment, the presence level processing illustrated in FIG. 8 is performed, and then the likelihood of a region adjacent to a region where the observation target is not present among the regions where the observation target may be present is replaced by the lowest likelihood in the range where it is judged that the observation target 6 is present. Thus, as illustrated in FIG. 7B, the presence level of the outermost regions among the regions of "Level 2" and "Level 1" where the observation target 6 may be present is set to "1". As a result, the imaging order is created in such a manner that imaging is performed from regions with a higher likelihood in decreasing order, and therefore a portion where the observation target 6 is certainly present is preferentially imaged, and the periphery of the observation target 6 is imaged later.

Figure 9:
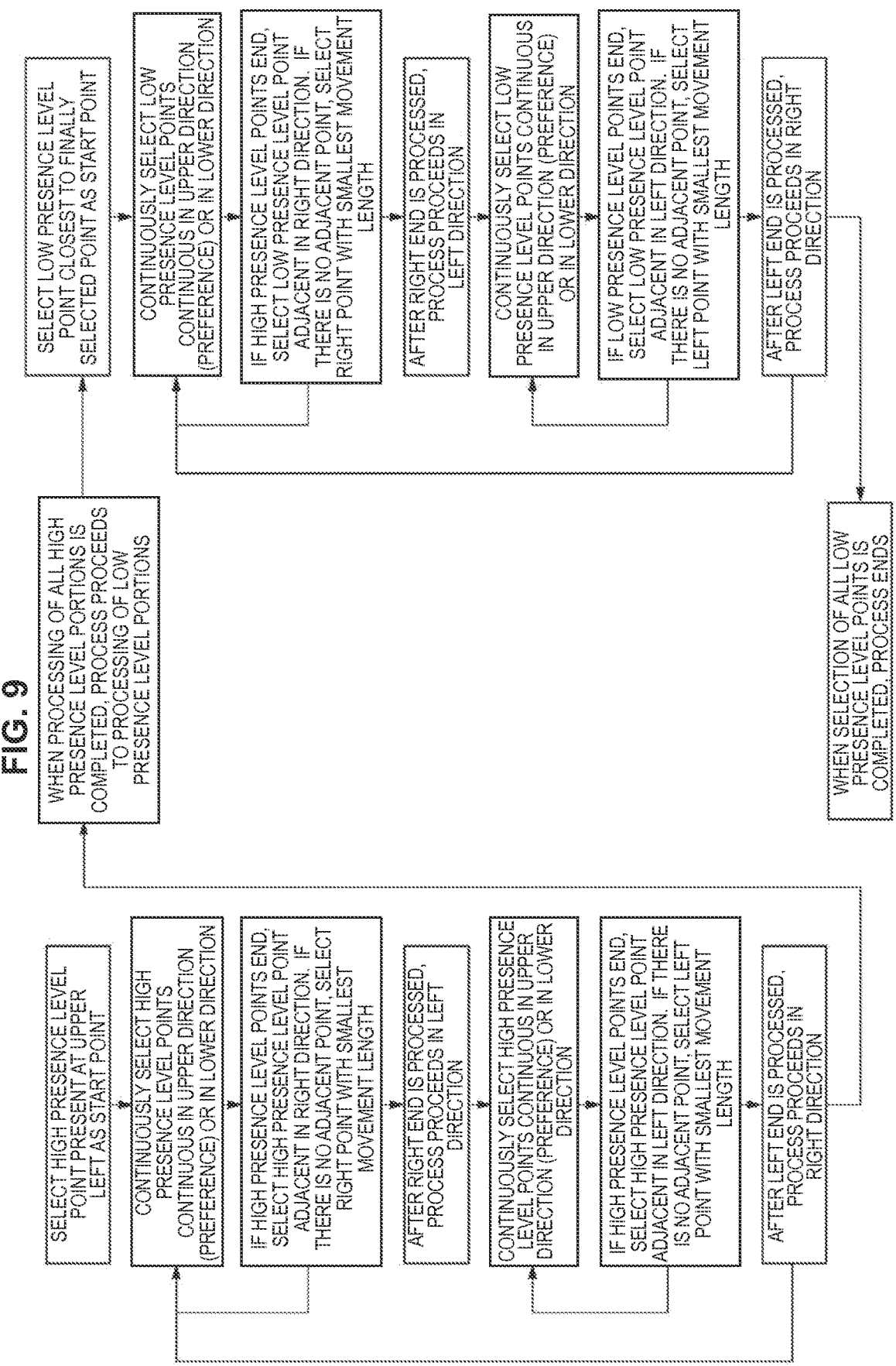
FIG. 9 is a flow chart diagram illustrating the flow of imaging order creation processing by the information processing device 2.
Figures 10, 11:
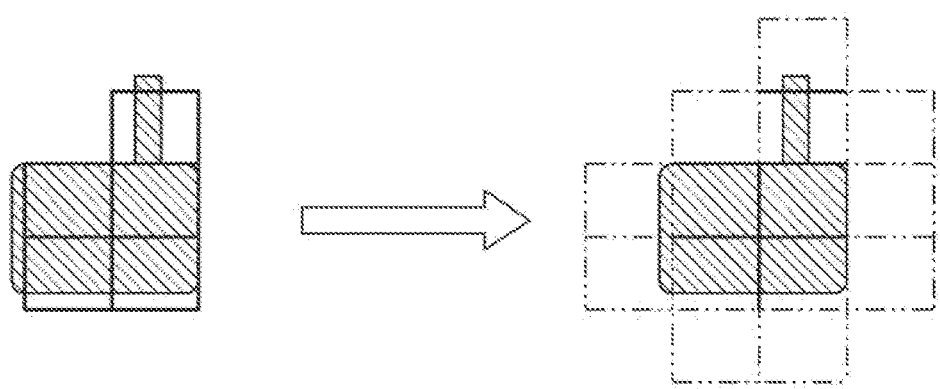
FIG. 10 includes FIGS. 10A, 10B, and 10C illustrating imaging order generated by an imaging order generation unit 235.
FIG. 11 is a view illustrating the outline of an imaging range addition processing in a microscope system of a second embodiment of the present disclosure.

Next, the presence map generation unit 234 creates a presence map showing presence information of the observation target in each region is created based on the presence level determined by the presence level processing unit 233 (Step S4). Then, the imaging order generation unit 235 creates imaging order of partial images based on the presence map (Step S5). FIG. 9 is a flow chart diagram illustrating the flow of the imaging order creation processing by the information processing device 2. FIG. 10 is a view illustrating the imaging order generated by the imaging order generation unit 235.

As illustrated in FIG. 9, the imaging order (imaging sequence) is created in such a manner that imaging is performed from regions with a higher likelihood (presence level) in decreasing order and also the movement length becomes smaller. Specifically, in the case where the likelihoods illustrated in FIG. 10A are calculated in Step S2, and the presence map illustrated in FIG. 10B is created through the presence level processing process of Step S3, the imaging order as illustrated in FIG. 10C is created.

When partial images are imaged according to the imaging order illustrated in FIG. 10C, even among regions where the observation target may be present, a region adjacent to a region where the observation target may be present is imaged first and a region adjacent to a region where the observation target is not present is imaged later. Thus, also in processing of combining the partial images described later, the processing is performed in the same order, so that the matching is not achieved, and the number of times of combining the partial images according to the position information decreases. As a result, the combining accuracy when compositing an image improves.

Next, as illustrated in FIG. 6, the imaging order (imaging sequence) created by the imaging order generation unit 235 is output to the imaging control unit 24 through the interface 231, and the imaging control unit 24 controls the drive of the digital microscope 1 based on the imaging order. Thus, the partial images are imaged by the partial image imaging unit 12 of the digital microscope 1 based on the imaging order (Step S6).

The partial images imaged by the partial image imaging unit 12 are successively output to the information processing device 2, and are combined in the image composited substance 25 (Step S7). According to the microscope system of this embodiment, portions where the observation target is certainly present are preferentially imaged, and then combining the portions, and therefore an error is difficult to occur in the combining processing. As a result, the partial images can be combined with high accuracy to composite a microscope observation image with a wide visual field and with a high resolution.

Moreover, according to the microscope system of this embodiment, since the region in which the observation target may be present and which is adjacent to the region where the observation target is not present (for example, the periphery of the observation target and the like) is imaged later, useless movement can be reduced when imaging the partial images. As a result, the time required for the imaging processing can also be shortened.

2. Second Embodiment

Next, a microscope system according to a second embodiment of the present disclosure is described. According to the microscope system of this embodiment, in order to avoid miss-imaging, the likelihood is changed in such a manner that a region larger than a region where an observation target may be present is imaged. FIG. 11 is a view illustrating the outline of imaging range addition processing in the microscope system of this embodiment.

According to the microscope system of this embodiment, the presence level processing 233 replaces the likelihood of a region adjacent to a region where the observation target may be present among regions where the observation target is not present by the minimum likelihood in the range where it is judged that the observation target is present. For example, when each region of the entire image is classified into three stages: a region (Level 2) where the observation target is present, a region (Level 1) where the observation target may be present, and a region (Level 0) where the observation target is not present, the level of a region of Level 0 adjacent to regions of Levels 1 and 2 is changed to Level 1.

Thus, as illustrated in FIG. 11, a range (presence levels 1 and 2) where partial images are imaged is added, so that regions around the regions where the observation target is present are also imaged. As a result, the regions where the observation target is present can be certainly imaged. The configurations and the effects other than those in the microscope system of this embodiment are the same as those of the first embodiment described above.

Additionally, the present technology may also be configured as below.

(1)

An information processing device including:

an image analysis unit which divides an entire image in which an entire observation target region is imaged into a plurality of regions, and then judges whether an observation target is present in each region; and an imaging control unit which controls imaging of partial images with a magnification higher than a magnification of the entire image corresponding to the regions based on judgment results of the image analysis unit, wherein the imaging control unit controls the imaging in a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

(2)

The information processing device according to (1), wherein the image analysis unit calculates a likelihood showing a possibility that the observation target is present in each region.

(3)

The information processing device according to (2), wherein the imaging control unit controls the imaging of the partial images in a manner that imaging is performed from a region with a higher likelihood in decreasing order.

(4)

The information processing device according to (2) or (3), including:

a presence level processing unit which lowers a likelihood of a region adjacent to a region where the observation target is not present among regions where the observation target may be present.

(5)

The information processing device according to (4), wherein the presence level processing unit replaces the likelihood of the region adjacent to the region where the observation target is not present among the regions where the observation target may be present by a minimum likelihood in a range where it is judged that the observation target is present.

(6)

The information processing device according to (4) or (5), wherein the presence level processing unit classifies each region of the entire image into a first region where the observation target is present with a first likelihood, a second region where the observation target is present with a second likelihood lower than the first likelihood, and a third region where the observation target is not present and also classifies the region adjacent to the region where the observation target is not present among the regions where the observation target may be present into the second region.

(7)

The information processing device according to any one of (4) to (6), wherein the presence level processing unit replaces a likelihood of the region adjacent to the region where the observation target may be present among the regions where the observation target is not present by a minimum likelihood in a range where it is judged that the observation target is present.

(8)

The information processing device according to any one of (4) to (7), wherein the presence level processing unit classifies each region of the entire image into a first region where the observation target is present with a first likelihood, a second region where the observation target is present with a second likelihood lower than the first likelihood, and a third region where the observation target is not present and also changes the classification of the region adjacent to the region where the observation target may be present among the regions where the observation target is not present to the second region from the third region.

(9)

The information processing device according to any one of (1) to (8), including:

a presence map generation unit which creates a presence map showing presence information of the observation target based on the judgment results of the image analysis unit.

(10)

The information processing device according to any one of (1) to (9), including:

an imaging order generation unit which creates imaging order of the partial images based on the judgment results of the image analysis unit, wherein the imaging control unit controls drive of the microscope based on the imaging order created by the imaging order generation unit.

(11)

The information processing device according to (10), wherein the imaging order generation unit creates the imaging order in a manner that movement length becomes smaller.

(12)

The information processing device according to any one of (1) to (11), further including:

an entire image storage unit in which the entire image is stored.

(13)

The information processing device according to any one of (1) to (12), further including: an image compositing unit which combines the partial images to composite a microscope observation image with a magnification higher than a magnification of the entire image.

(14)

The information processing device according to any one of (1) to (13), further including:

a communication unit capable of communicating with a server on a network, wherein the image analysis unit transmits information on the judgment results of the regions obtained by the image analysis unit to the server through the communication unit.

(15)

An information processing method including:

an image analysis step of dividing an entire image in which an entire observation target region is imaged into a plurality of regions, and then judging whether an observation target is present in each region by an image analysis unit; and an imaging control step of controlling imaging of partial images corresponding to the regions and having a magnification higher than a magnification of the entire image based on judgment results in the image analysis step by an imaging control unit, wherein the imaging control step controls the imaging in a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

(16)

A program, which causes a computer to execute:

an image analysis function of dividing an entire image in which an entire observation target region is imaged into a plurality of regions, and then judging whether an observation target is present in each region; and an imaging control function of, in imaging of partial images with a magnification higher than a magnification of the entire image corresponding to the regions based on judgment results obtained by the image analysis function, controlling the imaging in a manner that a first partial image corresponding to a region in which the observation target may be present and which is adjacent to a region where the observation target may be present is imaged, and then a second partial image corresponding to a region in which the observation target may be present and is adjacent to a region where the observation target is not present which is imaged.

(17)

A microscope system at least including:

a microscope device at least having an entire image imaging unit which images an entire observation target region and a partial image imaging unit which images a part of the observation target region with a magnification higher than a magnification of the entire image; and an information processing device which controls the microscope device and processes each image imaged by the microscope device, wherein the information processing device includes an image analysis unit which divides an entire image in which an entire observation target region is imaged into a plurality of regions, and then judges whether an observation target is present in each region, and an imaging control unit which controls imaging of partial images with a magnification higher than a magnification of the entire image corresponding to the regions based on judgment results of the image analysis unit, wherein the imaging control unit controls the imaging in a manner that a first partial image corresponding to a region in which the observation target may be present and which is adjacent to a region where the observation target may be present is imaged, and then a second partial image corresponding to a region in which the observation target may be present and which is adjacent to a region where the observation target is not present is imaged.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 digital microscope
2 information processing device
3 server
4 image display unit
5 network
6 observation target 11 entire image imaging unit
12 partial image imaging unit
13 imaging device controller
14, 26, 231 interface
21 CPU
22 memory
23 image processing unit
24 imaging control unit
25 image compositing unit
27 hard disk
232 image analysis unit
233 presence level processing unit
234 presence map generation unit
235 imaging order generation unit

The invention claimed is:

1. An information processing system comprising:
an image analysis unit configured to divide a first image in which an observation target region is imaged into a plurality of regions, then judge whether the observation target is present in each region, calculate a likelihood showing a possibility that the observation target is present in each region in the plurality of regions, and lower a likelihood of a region adjacent to a region where the observation target is not present among regions where the observation target may be present; and
an imaging order generation unit configured to determine an imaging order of each region in the plurality of regions in a manner that imaging is performed from a region with a higher likelihood in decreasing order.

2. The information processing system according to claim 1, wherein an existence map is generated based on the result of the image analysis.

3. The information processing system according to claim 1, wherein a first imaging unit of an imaging device is caused to obtain the first image, and a second imaging unit of the imaging device is caused to obtain a second image based on the imaging order.

4. The information processing system according to claim 1, further comprising:
an imaging control unit configured to control imaging of partial images with a magnification higher than a magnification of the first image corresponding to the regions based on the imaging order.

5. The information processing system according to claim 1, further comprising:
an image compositing unit configured to combine the partial images to composite a microscope observation image.

6. The information processing system according to claim 1, wherein a region which is not included in the imaging order is determined based on the likelihood.

7. An information processing method comprising:
dividing a first image in which an observation target region is imaged into a plurality of regions;
judging whether the observation target is present in each region;
calculating a likelihood showing a possibility that the observation target is present in each region;
lower a likelihood of a region adjacent to a region where the observation target is not present among regions where the observation target may be present; and
determining an imaging order of each region in a manner that imaging is performed from a region with a higher likelihood in decreasing order.

8. A non-transitory computer readable medium storing a program, which causes a computer to execute the information processing method according to claim 7.

9. The information processing system according to claim 4, further comprising:
a microscope is configured to obtain the partial images.

10. The information processing system according to claim 5, wherein the image compositing unit is configured to combine the partial images in the same order as the partial images are obtained.

11. The information processing method according to claim 7, further comprising generating an existence map based on the result of the image analysis.

12. The information processing method according to claim 7, further comprising obtaining, by a first imaging unit of an imaging device, the first image, and obtaining, by a second imaging unit of the imaging device, a second image based on the imaging order.

13. The information processing method according to claim 7, further comprising:
controlling imaging of partial images with a magnification higher than a magnification of the first image corresponding to the regions based on the imaging order.

14. The information processing method according to claim 7, further comprising:
combining the partial images to composite a microscope observation image.

15. The information processing method according to claim 7, wherein a region which is not included in the imaging order is determined based on the likelihood.

16. The information processing method according to claim 7, further comprising:
obtaining, by a microscope, the partial images.

17. The information processing method according to claim 14, further comprising combining the partial images in the same order as the partial images are obtained.

18. An information processing device comprising:
an image analysis unit configured to divide a first image in which an observation target region is imaged into a plurality of regions, then judge whether the observation target is present in each region, calculate a likelihood showing a possibility that the observation target is present in each region in the plurality of regions, and lower a likelihood of a region adjacent to a region where the observation target is not present among regions where the observation target may be present; and
an imaging order generation unit configured to determine an imaging order of each region in the plurality of regions in a manner that imaging is performed from a region with a higher likelihood in decreasing order.

* * * * *